US006638195B2

(12) United States Patent
Williams

(10) Patent No.: US 6,638,195 B2
(45) Date of Patent: Oct. 28, 2003

(54) HYBRID VEHICLE SYSTEM

(75) Inventor: Cameron P. Williams, Waterford, MI (US)

(73) Assignee: New Venture Gear, Inc., Troy, MI (US)

(*) Notice: Subject to any disclaimer, the term of this patent is extended or adjusted under 35 U.S.C. 154(b) by 0 days.

(21) Appl. No.: 10/083,885

(22) Filed: Feb. 27, 2002

(65) Prior Publication Data

US 2003/0162631 A1 Aug. 28, 2003

(51) Int. Cl.[7] .............................................. B60K 41/02
(52) U.S. Cl. ........................ 477/5; 180/243; 180/65.2; 192/50
(58) Field of Search .................. 477/3, 4, 5; 180/242, 180/243, 65.2, 65.4; 290/4.5, 14; 192/49, 50

(56) References Cited

U.S. PATENT DOCUMENTS

| | | | |
|---|---|---|---|
| 5,119,900 A | * | 6/1992 | Watanabe et al. ............ 180/245 |
| 5,141,072 A | * | 8/1992 | Shibahata .................... 180/245 |
| 5,353,889 A | * | 10/1994 | Hamada ...................... 180/242 |
| 5,368,120 A | * | 11/1994 | Sakai et al. ................. 180/65.2 |
| 5,562,566 A | * | 10/1996 | Yang ............................. 477/3 |
| 5,839,328 A | * | 11/1998 | Showalter .................... 74/650 |
| 5,848,679 A | | 12/1998 | Saiko et al. |
| 5,927,456 A | | 7/1999 | Monahan et al. |
| 6,041,877 A | * | 3/2000 | Yamada et al. ............. 180/65.2 |
| 6,059,064 A | * | 5/2000 | Nagano et al. .............. 180/243 |
| 6,068,097 A | | 5/2000 | Kurita |
| 6,105,703 A | * | 8/2000 | Kuroda et al. .............. 180/248 |
| 6,206,164 B1 | | 3/2001 | Kurita |
| 6,244,403 B1 | | 6/2001 | Ito et al. |
| 6,257,384 B1 | | 7/2001 | Sato et al. |
| 2001/0042649 A1 | * | 11/2001 | Maeda et al. ................ 180/242 |
| 2002/0058564 A1 | * | 5/2002 | Yamamoto et al. ............. 477/3 |
| 2003/0042054 A1 | * | 3/2003 | Matsubara et al. .......... 180/65.2 |

* cited by examiner

Primary Examiner—Charles A. Marmor
Assistant Examiner—Dennis Abdelnour
(74) Attorney, Agent, or Firm—Harness, Dickey & Pierce, P.L.C.

(57) ABSTRACT

A hybrid vehicle system is provided with an internal combustion engine driving one set of wheels and an electric motor connected to the other wheels via an active clutch system. A power take-off unit is provided for selectively providing driving torque from the internal combustion engine to the electric motor to operate the motor in a regenerative operating mode. The active clutch system is selectively engaged and disengaged based upon whether the vehicle is operating in an internal combustion engine operating mode, an electric motor operating mode, a combined electric motor and internal combustion engine operating mode, or a regenerative operating mode.

26 Claims, 3 Drawing Sheets

HYBRID VEHICLE SYSTEM

FIELD OF THE INVENTION

The present invention relates to a vehicle powertrain, and more particularly, to a hybrid drive system for motor vehicles.

BACKGROUND OF THE INVENTION

Automobile manufacturers are actively working to develop alternative powertrain systems in an effort to reduce the level of pollutants exhausted into the air by conventional powertrains equipped with internal combustion engines and to reduce fuel consumption thereof. Significant development has been directed to hybrid electric vehicles. Several different hybrid electric vehicles (HEV) "have recently been offered for sale. " These hybrid vehicles are equipped with an internal combustion engine and an electric motor that can be operated independently or in combination to drive the vehicle.

There are two types of hybrid vehicles, namely, series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilizes a low-load mode where only the electric motor is used to drive the vehicle, an intermediate-load mode where only the engine is used to drive the vehicle, and a high-load mode where the engine and electric motor are both used to drive the vehicle.

Hybrid powertrains have been adapted for use in four-wheel drive vehicles and typically utilize the above-noted parallel hybrid powertrain to drive the primary wheels and a secondary electric motor to drive the secondary wheels. It is desired to provide these four-wheel drive vehicles with an active torque bias front axle for improved vehicle handling and traction control while also providing regeneration during vehicle braking. In addition, improved efficiency and reduction of components is also desirable.

SUMMARY OF THE INVENTION

It is an object to the present invention to provide a hybrid powertrain drive system for a four-wheel drive vehicle.

It is another object to the present invention to provide an efficient hybrid drive system which utilizes an increased efficiency automated manual transmission.

It is still another object to, the present invention to provide a four-wheel drive hybrid drive system with an active torque bias front axle for improved vehicle handling and traction control.

These and other objects of the present invention are obtained by providing a hybrid drive system including an engine and an electric motor connected to the engine via a power transfer unit. A first axle assembly is drivingly connected to the electric motor and includes an active clutch system to selectively apply driving torque from the electric motor to a pair of drive axles. A transmission assembly is selectively connected to the engine and is drivingly connected to a second axle assembly. The transmission assembly is engaged with the engine during an engine-driving mode for providing driving torque to the second axle assembly. The transmission assembly is also engaged with the engine for providing driving torque to the second axle assembly and the electric motor is activated to provide driving torque to the first axle assembly while the active clutch system is engaged during a combined engine and electric motor driving mode. The electric motor is activated to provide driving torque to the first axle assembly while the active clutch system is engaged during an electric motor driving mode. In addition, the power transfer unit is engageable during an engine driving mode for driving the electric motor as a generator for generating electricity to charge a battery.

A control unit is provided for controlling the engine, the electric motor, the transmission assembly, the power transfer unit and the active clutch system. The electric motor is operated in a regeneration mode when a braking signal is received by the control unit or at any other time that braking is necessary such as under engine braking conditions in order to give the proper driving feel. The control unit also increases an amount of electric motor torque delivered during a transmission assembly shifting operation in order to reduce shift shock during a shifting operation. The active clutch system includes a pair of active clutches for applying torque to the pair of drive axles as controlled by the control unit. The power transfer unit includes a gear train with a controllable clutch unit.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention is related to a hybrid drive system for a vehicle which functions to provide driving torque to both front and rear ground-engaging wheels of a vehicle. The hybrid drive system employs an engine and an electric motor along with an automated manual transmission, a controllable power take-off unit for delivering engine torque to the electric motor for operation in a regenerative mode, and an active clutch system for providing driving torque from the electric motor to a pair of ground-engaging wheels.

Figure 1:
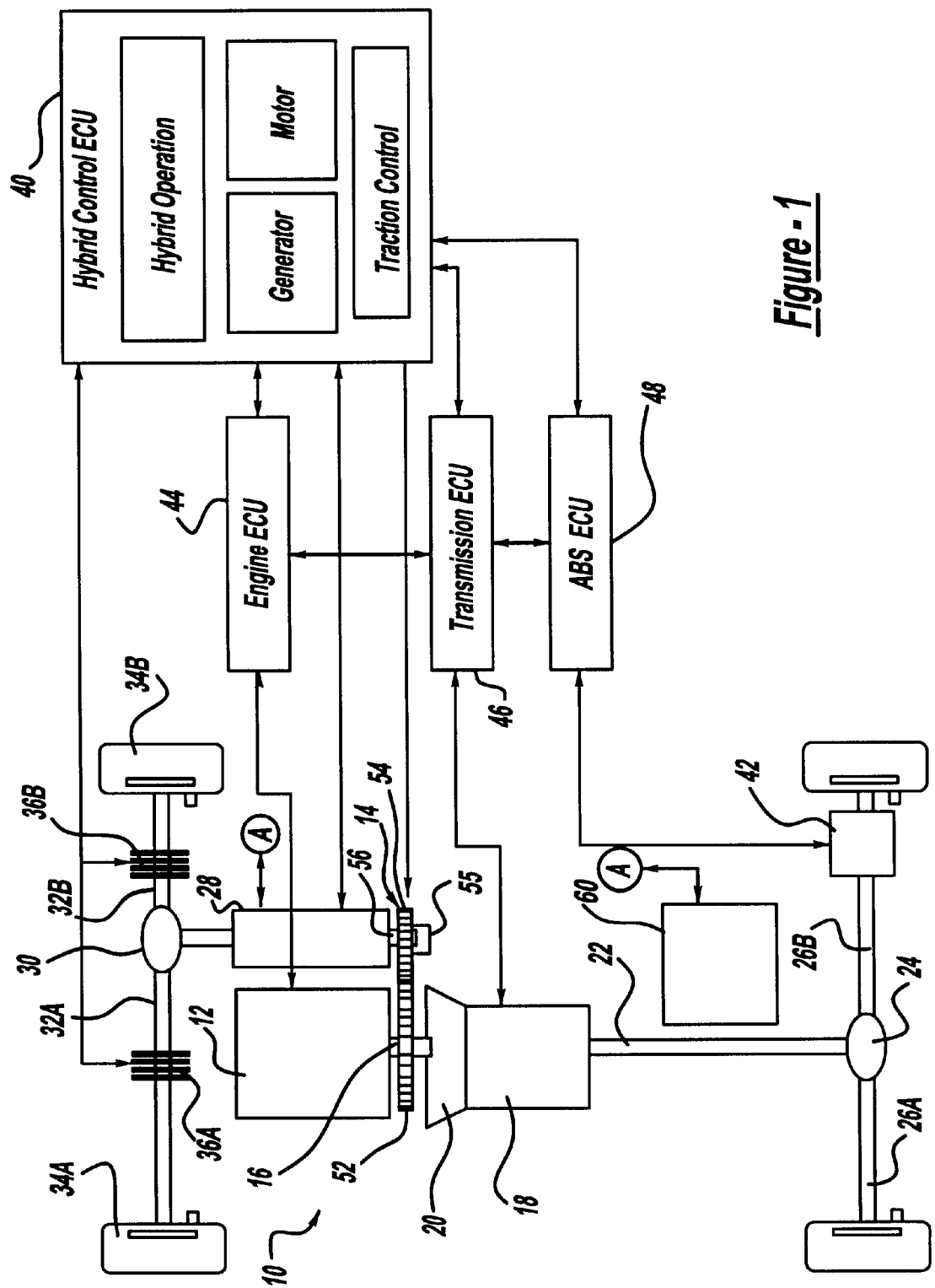
FIG. 1 is a schematic view of a powertrain for a hybrid electric vehicle according to the principles of the present invention.

With reference to FIG. 1, the hybrid drive system 10 will now be described in greater detail. The hybrid drive system 10 includes an internal combustion engine 12 with an engine power take-off unit 14 connected to an engine crankshaft 16. An automated manual transmission 18 is connected to the internal combustion engine by a clutch 20. A rear prop shaft 22 is connected to the transmission 18 and provides driving torque to a rear axle differential 24 which delivers drive torque to a pair of axle shafts 26A, 26B. An electric motor 28 is connected to the engine power take-off unit 14. The electric motor 28 is connected to a right angle gear set 30 which drives a pair of front axle shafts 32A, 32B which deliver driving torque to the front ground-engaging wheels 34A, 34B via a pair of active clutches 36A, 36B which control the torque delivered to the front wheels 34A, 34B.

A hybrid control unit 40 communicates with an engine control unit 44, a transmission control unit 46 and an anti-lock braking system control unit 48. More specifically, the hybrid control unit 40 operates in conjunction with the engine control unit 44, transmission control unit 46 and anti-lock braking system control unit 48 for controlling the internal combustion engine 12, the automated manual transmission 18, the transmission clutch 20, the engine power take-off unit 14, the electric motor 28, the active clutches 36A, 36B and the vehicle anti-lock braking system 42.

Due to the ability to supplement the torque supplied by the internal combustion engine 12 with torque from the electric motor 28, the internal combustion engine 12 can be smaller in size for reduced weight and better fuel economy. The engine power take-off unit 14 preferably includes a gear set having a first gear 52 attached to the engine crankshaft 16 and a second gear 54 attached to an input shaft 56 of the electric motor 28. The engine power take-off unit is provided with a controllable clutch 55 which can be operably engaged with one of the gears 52, 54 to allow the gears to selectively permit different speeds between the two shafts 16, 56. The controllable clutch 55 is preferably a bi-directional overrunning clutch which can be selectively engaged to be overrunning in a forward direction, a rearward direction or selectively locked for direct drive engagement. A similar clutch of this type is disclosed in U.S. Pat. No. 6,244,403 which is herein incorporated by reference.

The transmission 18 is preferably an automated manual transmission with automated controls for electrically controlling the shifting between various gear ratios as is known in the art. In addition, the transmission clutch 20 is also electronically controlled to engage the automated manual transmission 18 to the crankshaft 16 of the internal combustion engine 12. The automated manual transmission 18 is recognized as being more efficient than standard hydraulically-controlled automatic transmissions which have parasitic losses which reduce the overall fuel efficiency of a vehicle powertrain system.

Figure 3:
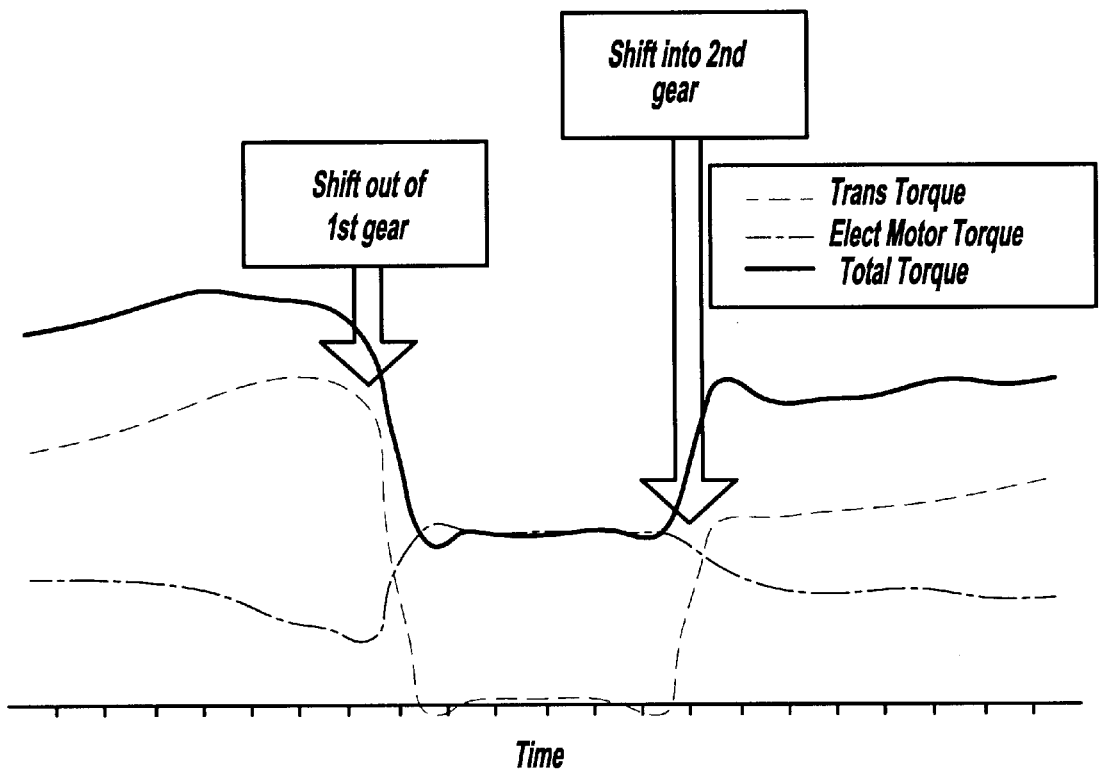
FIG. 3 is a graphical diagram of the transmission and electric motor torque applied during a first gear to second gear shift according to the principles of the present invention.

The electric motor 28 is utilized as a motor/generator and thereby permits the elimination of an alternator since the motor/generator 28 can be utilized to charge the battery unit 60 as will be described in greater detail herein. The electric motor 28 can be utilized to supplement the drive torque of the internal combustion engine 12 in order to provide improved shift feel during shifting of the automated manual transmission 18. In particular, for smoother driving, the control unit uses the electric motor 28 to supplement torque interrupt caused during shifting of the automated manual transmission 18. As graphically illustrated in FIG. 3, when the transmission clutch 20 is disengaged in order to shift the automated manual transmission 18 from, for example, first gear to second gear, the transmission torque drops suddenly during the transition from the first gear to second gear disengagement and engagement. Thus, the hybrid control unit 40 increases the amount of electric motor torque supplied to the ground-engaging wheels in order to supplement the torque interrupt caused during the shifting of the transmission. The effect is to provide for smoother driving during shifting operations.

The hybrid drive system 10 provides a four-wheel drive system with active torque bias at the front axle for improved vehicle handling and traction control by engagement of the active clutch system 36. According to a preferred embodiment, the active clutch system 36 utilizes a pair of active clutches 36A, 36B provided on each of the front axles 32A, 32B, respectively. The use of a pair of active clutches 36A, 36B allows for side-to-side traction and stability control in addition to front-to-rear stability and traction control.

Figure 2:
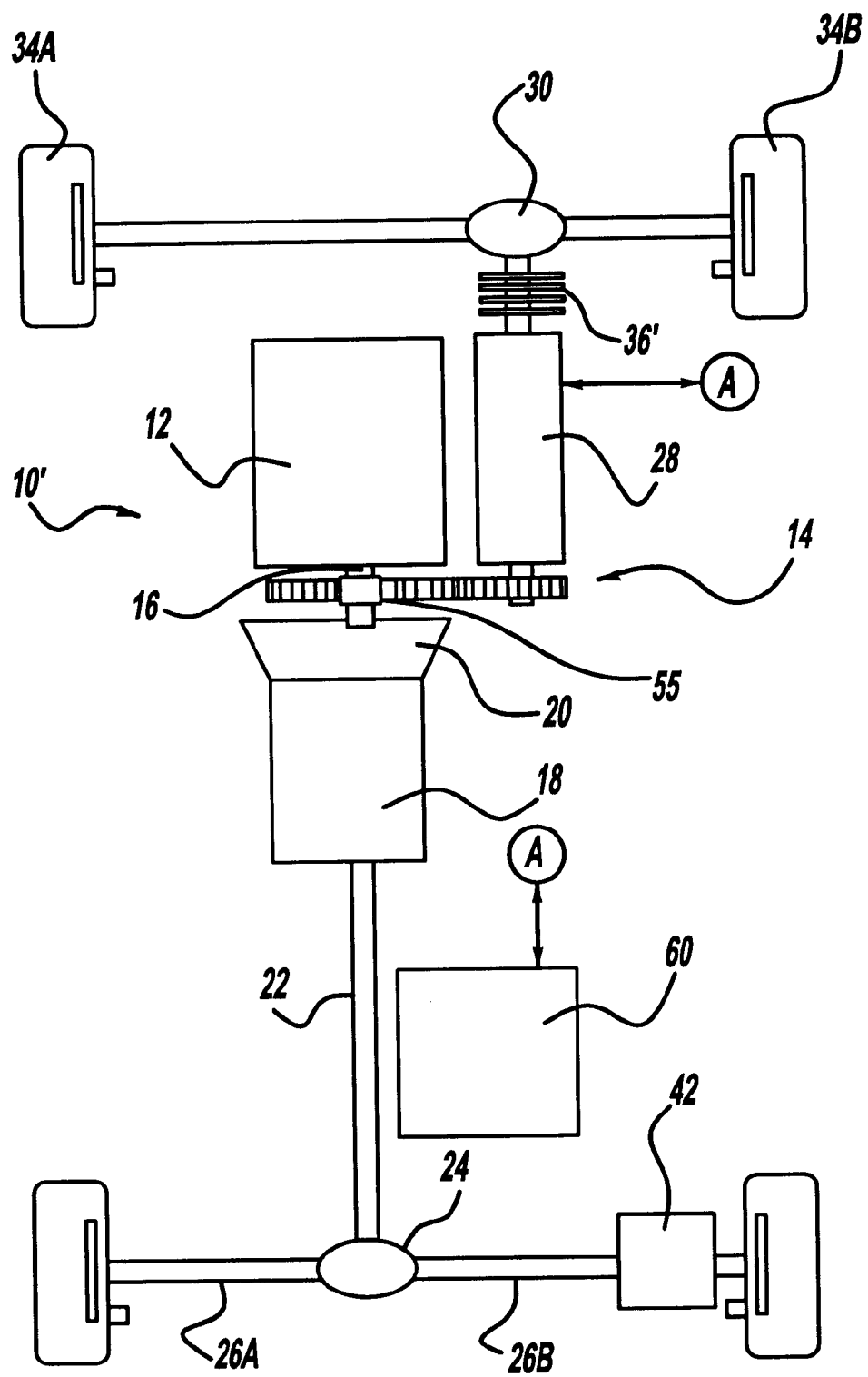
FIG. 2 is a schematic view of a powertrain for a hybrid electric vehicle according to an alternative embodiment of the present invention.

An alternative configuration of the active clutch system 36 provides a single active clutch 36' as shown in FIG. 2 which is provided between the electric motor 28 and the right angle gearset with differential 30. This active clutch system 36' does not provide for side-to-side traction and stability control but still has front-to-rear stability and traction control functionality. The active clutch system 36, as shown in either FIG. 1 or FIG. 2, is controlled by the hybrid control unit 40 based upon sensed wheel-slip and torque delivery conditions.

With reference to the accompanying drawings, the hybrid control unit 40 controls the hybrid drive system 10 in several operable modes including an internal combustion engine only mode, an internal combustion engine with electric motor assist mode, and an electric drive only mode. During the internal combustion engine only mode, the internal combustion engine 12 provides driving torque to the automated manual transmission 18 through the transmission clutch 20 which is engaged. If the battery power of battery unit 60 is sufficient, the controllable bi-directional clutch 55 of the engine power take-off unit 14 is overrunning and doesn't transmit power to the electric motor 28. If the battery needs charging as determined by the control unit strategy, the bi-directional clutch 55 is engaged and the motor 28 becomes a generator to charge the battery 60. No torque is transmitted to the front tires since the controllable active clutch system 36 is disengaged.

In a combined internal combustion engine and electric motor assist driving mode, the internal combustion engine provides driving torque to the automated manual transmission 18 via the transmission clutch 20 which is engaged. The controllable bi-directional clutch 55 over-runs in an unlocked condition so that the electric motor 28 can rotate independently of the engine 12 and transmission 18. The electric motor 28 transmits torque to the front wheels via the controlled active clutches 36A, 36B. Power can be applied to the left and right front wheels independently to improve handling, traction, or vehicle stability. This is advantageous during cornering maneuvers since the electric motor can push the outside wheel with greater speed to help it around the corner therefore reducing or eliminating under-steer. More specifically, when cornering, the outside wheel must spin faster than the inside wheel due to the larger radius in which it is moving. Thus, by appropriate engagement of the active clutches 36A, 36B, the torque applied to the left and front wheels can be independently controlled by the hybrid control unit 40 to improve handling, traction and vehicle stability. During shifting, the controller 40 determines the electric motor speed and active clutch torque to reduce the torque interrupt experienced when disengaging the transmission clutch 20 of the automated manual transmission 18. This torque interrupt is caused by the reduction in torque that occurs when the transmission 18 must be disengaged from the engine 12 to shift from one gear to another as described above with respect to FIG. 3. By modifying the electric motor/active clutch speeds and torques, this shift-shock feeling can be minimized as discussed above.

In an electric drive operating mode, the internal combustion engine 12 is shut down in order to conserve fuel. The batteries power the electric motor 28 which transmits power through the active clutch system 36 to the front wheels 34A, 34B. The controllable bi-directional clutch 55 is disengaged to prevent parasitic losses through the transmission 28 or internal combustion engine 12. This method is much more efficient than current technologies that rotate the engine and/or transmission with the electric motor. In this mode, it is possible to use the active clutches 36A, 36B for side-to-side traction or stability control even though the powertrain is in an electric drive operating mode.

The hybrid control unit 40 senses the charge level of the battery unit 60, the vehicle throttle position, vehicle speed and other vehicle parameters to re-charge the batteries and keep them charged for optimum performance. When the vehicle is in motion, during an internal combustion engine only operating mode, the bi-directional clutch 55 of the power take-off unit 14 is engaged in order to drive the electric motor/generator 28 as a generator when the vehicle is in motion. The active clutches 36a, 36b are disengaged in order to prevent speed and torque differences between the front and rear wheels.

During braking or coasting, the active clutches 36A, 36B can be engaged and the electric motor 28 can be used to generate electric power to be stored by the batteries 60. The controllable bi-directional clutch 55 is disengaged in this brake regeneration mode to prevent speed differences between the electric motor 28 and the engine 12/transmission 28.

When the vehicle is stopped and no wheels are moving, the transmission clutch 20 is disengaged. If the battery needs charging, the internal combustion engine is utilized to transmit power through the controllable bi-directional clutch 55 of the power take-off unit 14 to drive the electric motor/generator 28 in a generator mode in order to generate electricity to recharge the battery unit 60. Since the active clutches 36A, 36B and the transmission clutch 20 are disengaged, the vehicle can recharge without moving.

The description of the invention-is merely exemplary in nature and, thus, variations that do not depart from the gist of the invention are intended to be within the scope of the invention. Such variations are not to be regarded as a departure from the spirit and scope of the invention.

What is claimed is:

1. A hybrid drive system, comprising:
    an engine;
    a power transfer unit connected to said engine;
    an electric motor connected to said power transfer unit;
    a first axle assembly drivingly connected to said electric motor, said first axle assembly including an active clutch system to selectively apply driving torque from said electric motor to a pair of drive axles;
    a transmission assembly selectively connected to said engine; and
    a second axle assembly drivingly connected to said transmission assembly.

2. The hybrid drive system according to claim 1, wherein said transmission assembly is engaged with said engine during an engine driving mode for providing torque to said second axle assembly.

3. The hybrid drive system according to claim 1, wherein said transmission assembly is engaged with said engine for providing driving torque to said second axle assembly and said electric motor is activated to provide driving torque to said first axle assembly while said active clutch system is engaged during a combined engine and electric motor driving mode.

4. The hybrid drive system according to claim 1, wherein said electric motor is activated to provide driving torque to said first axle assembly while said active clutch system is engaged during an electric motor driving mode.

5. The hybrid drive system according to claim 1, wherein said power transfer unit is engaged during an engine driving mode for driving said electric motor as a generator.

6. The hybrid drive system according to claim 1, further comprising a control unit for controlling said engine, said electric motor, said transmission assembly, said power transfer unit and said active clutch system.

7. The hybrid drive system according to claim 6, wherein said electric motor is operated in a regeneration mode-when a braking signal is received by said control unit.

8. The hybrid drive system according to claim 6, wherein said control unit increases an amount of electric motor torque delivered during a transmission assembly shifting operation in order to reduce shift shock during a shifting operation.

9. The hybrid drive system according to claim 1, wherein said transmission assembly is an automated manual transmission.

10. The hybrid drive system according to claim 1, wherein said active clutch system includes a pair of active clutches for applying torque to said pair of drive axles.

11. The hybrid drive system according to claim 1, wherein said active clutch system includes at least one active clutch for applying torque to said pair of drive axles.

12. The hybrid drive system according to claim 1, wherein said power transfer unit includes a gear train with a controllable clutch unit.

13. The hybrid drive system according to claim 12, wherein said controllable clutch unit of said power transfer unit is a bi-directional overrunning clutch.

14. A four wheel drive vehicle, comprising:
    an engine;
    a transmission assembly selectively connected to said engine;
    a first pair of driven wheels drivingly connected to said transmission;
    a power transfer unit connected to said engine;
    an electric motor connected to said power transfer unit; and
    a second pair of driven wheels selectively connected to said electric motor by an active clutch system disposed between said electric motor and said second pair of driven wheels.

15. The four wheel drive vehicle according to claim 14, wherein said transmission assembly is engaged with said engine during an engine driving mode for providing torque to said second axle assembly.

16. The four wheel drive vehicle according to claim 14, wherein said transmission assembly is engaged with said engine for providing driving torque to said second axle assembly and said electric motor is activated to provide driving torque to said first axle assembly while said active clutch system is engaged during a combined engine and electric motor driving mode.

17. The four wheel drive vehicle according to claim 14, wherein said electric motor is activated to provide driving torque to said first axle assembly while said active clutch system is engaged during an electric motor driving mode.

18. The four wheel drive vehicle according to claim 14, wherein said power transfer unit is engaged during an engine driving mode for driving said electric motor as a generator.

19. The four wheel drive vehicle according to claim 14, further comprising a control unit for controlling, said engine, said electric motor, said transmission assembly, said power transfer unit and said active clutch system.

20. The four wheel drive vehicle according to claim 19, wherein said electric motor is operated in a regeneration mode when a braking signal is received by said control unit.

21. The four wheel drive vehicle according to claim 19, wherein said control unit increases an amount of electric motor torque delivered during a transmission assembly shifting operation in order to reduce shift shock during a shifting operation.

22. The four wheel drive vehicle according to claim 14, wherein said transmission assembly is an automated manual transmission.

23. The four wheel drive vehicle according to claim 14, wherein said active clutch system includes a pair of active clutches for applying torque to said pair of drive axles.

24. The four wheel drive vehicle according to claim 14, wherein said active clutch system includes at least one active clutch for applying torque to said pair of drive axles.

25. The four wheel drive vehicle according to claim 14, wherein said power transfer unit includes a gear train with a controllable clutch unit.

26. The four wheel drive vehicle according to claim 25, wherein said controllable clutch unit of said power transfer unit is a bi-directional overrunning clutch.

* * * * *